(12) United States Patent
Sallam

(10) Patent No.: US 8,863,159 B2
(45) Date of Patent: Oct. 14, 2014

(54) SYSTEM, METHOD AND COMPUTER PROGRAM PRODUCT FOR INSERTING AN EMULATION LAYER IN ASSOCIATION WITH A COM SERVER DLL

(75) Inventor: Ahmed Said Sallam, Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 2019 days.

(21) Appl. No.: 11/484,088

(22) Filed: Jul. 11, 2006

(65) Prior Publication Data

US 2014/0196146 A1    Jul. 10, 2014

(51) Int. Cl.
  G06F 3/00      (2006.01)
  G06F 3/048     (2013.01)
  H04L 29/06     (2006.01)
  G06F 9/445     (2006.01)
  G06F 1/32      (2006.01)

(52) U.S. Cl.
  CPC ........ H04L 63/1416 (2013.01); G06F 9/44521 (2013.01); G06F 1/32 (2013.01)
  USPC .......................................... 719/331; 715/867

(58) Field of Classification Search
  CPC ........ G06F 9/44521; G06F 21/51; G06F 1/32
  USPC ............................ 719/328, 331, 332; 715/867
  See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,957,422 B2 * | 10/2005 | Hunt | 717/130 |
| 7,043,634 B2 * | 5/2006 | Wolff et al. | 713/165 |
| 7,370,360 B2 * | 5/2008 | van der Made | 726/24 |
| 7,506,155 B1 | 3/2009 | Stewart et al. | |
| 7,735,136 B2 * | 6/2010 | Mantripragada et al. | 726/22 |
| 2004/0107360 A1 * | 6/2004 | Herrmann et al. | 713/201 |
| 2005/0132232 A1 | 6/2005 | Sima | 713/201 |
| 2005/0149726 A1 | 7/2005 | Joshi et al. | 713/164 |
| 2008/0072324 A1 * | 3/2008 | Repasi et al. | 726/23 |
| 2008/0320595 A1 * | 12/2008 | van der Made | 726/24 |
| 2009/0320135 A1 * | 12/2009 | Cavanaugh | 726/24 |

OTHER PUBLICATIONS

Guy Bieber, Introduction to Service-Oriented Programming(Rev.2.1), 2001.*

* cited by examiner

*Primary Examiner* — Lechi Truong
(74) *Attorney, Agent, or Firm* — Patent Capital Group

(57) ABSTRACT

A system, method and computer program product are provided. In use, a COM server dynamic link library is identified. Further, an emulation layer is inserted in association with the COM server dynamic link library to emulate interfaces exported by the COM server dynamic link library. As an option, it may be determined whether the COM server DLL is loaded, and the emulation layer may be inserted in response to the determination.

20 Claims, 6 Drawing Sheets

SYSTEM, METHOD AND COMPUTER PROGRAM PRODUCT FOR INSERTING AN EMULATION LAYER IN ASSOCIATION WITH A COM SERVER DLL

FIELD OF THE INVENTION

The present invention relates to security applications, and more particularly to applications for securing dynamic link libraries (DLLs).

BACKGROUND

A dynamic link library (DLL) is a file that may be loaded and executed by programs dynamically. Basically, a DLL is an external code repository for various programs. Since several different programs typically reuse the same DLL instead of having such code in their own file, the DLL may potentially reduce required storage space by providing a "library" for common use.

Unfortunately, DLL sometimes take unwanted forms. For example, DLLs may include unwanted code in the form of spyware, user-mode root kits, backdoors, etc. which inject unwanted code into application address spaces. This may be accomplished by writing to the application memory remotely, creating a remote thread inside the application address space, etc. As a result, once an application is infected by such a DLL, other applications may also be infected as well.

A browser helper object (BHO) is a component object model (COM) server DLL module designed as a plug-in for the MICROSOFT INTERNET EXPLORER web browser to provide addition functionality. The BHO API exposes hooks that allow the BHO to access the document object model (DOM) of the current page and to control navigation. Because BHOs have unrestricted access to the INTERNET EXPLORER event model, some forms of unwanted code have also been created as BHOs.

For example, the "download.ject" exploit installed a BHO that activated upon detecting a secure HTTP connection to a financial institution, recorded user keystrokes (e.g. intending to capture passwords, etc.), and transmitted the information to a website used by computer criminals. Other BHOs such as the "MyWay Searchbar" tracked users browsing patterns, and passed the recorded information to third-parties.

By way of background, to create an instance of a COM object, a COM client application (which is INTERNET EXPLORER in the BHO case) typically calls the MICROSOFT COM runtime library. Upon handling the COM client application call, the COM runtime library checks first to see if the COM server DLL is loaded in memory or not. If the COM server DLL is not loaded in memory, the COM runtime library calls the WINDOWS loader to load the COM server DLL.

Next, the COM runtime library calls into the COM server DLL to create an instance of the COM server. The COM server DLL returns a pointer to its COM object interface, which is a pointer to an array of pointers to the interface-exported methods. The interface pointer is then returned back to the requesting COM client application through the COM runtime function. As a result, the COM client application (e.g. web browser, etc.) may keep the COM object interface pointer inside associated memory, and call into the COM interface methods via such methods pointers.

In order to effectively repair a BHO that has been subjected to unwanted code, such COM server DLL is freed from the application memory. Based on the way COM objects are instantiated in memory, such BHO may not be easily freed from the application memory after an instance of the BHO COM interface has been created by the application. Specifically, if the BHO DLL is freed from memory, various problems may be unfortunately encountered. For example, an attempt to free the BHO DLL from memory may cause the COM client application to crash upon calling such COM interface methods (since the functions are no longer placed in memory). Further, such attempt may leave a reference count of the COM objects instantiated by the unwanted BHO off by "1," since the BHO did not release the COM interface before it was unloaded from memory.

There is thus a need for overcoming these and/or other problems associated with the prior art.

SUMMARY

A system, method and computer program product are provided. In use, a COM server DLL is identified. Further, an emulation layer is inserted in association with the COM server DLL to emulate interfaces exported by the COM server DLL.

DETAILED DESCRIPTION

Figure 1:
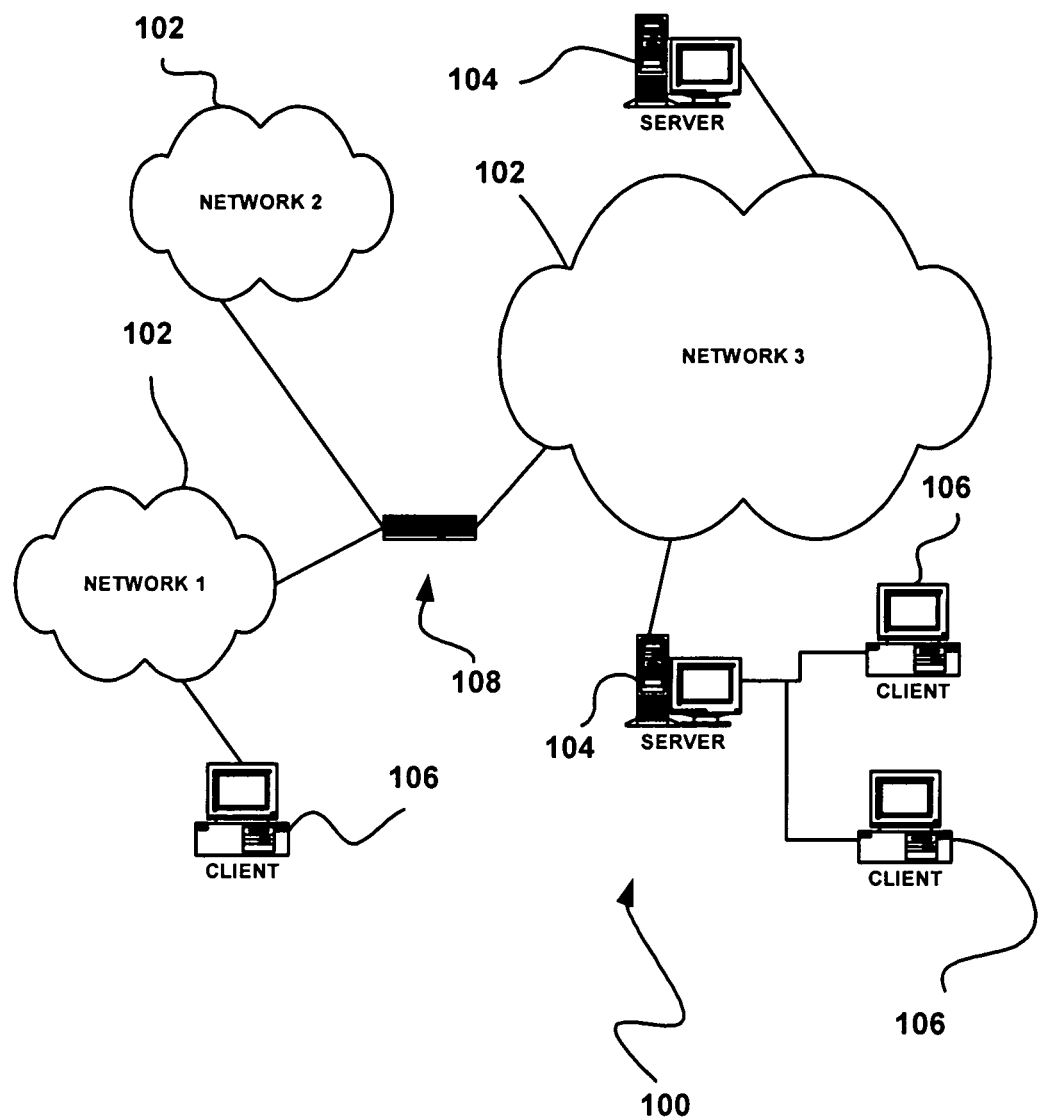
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
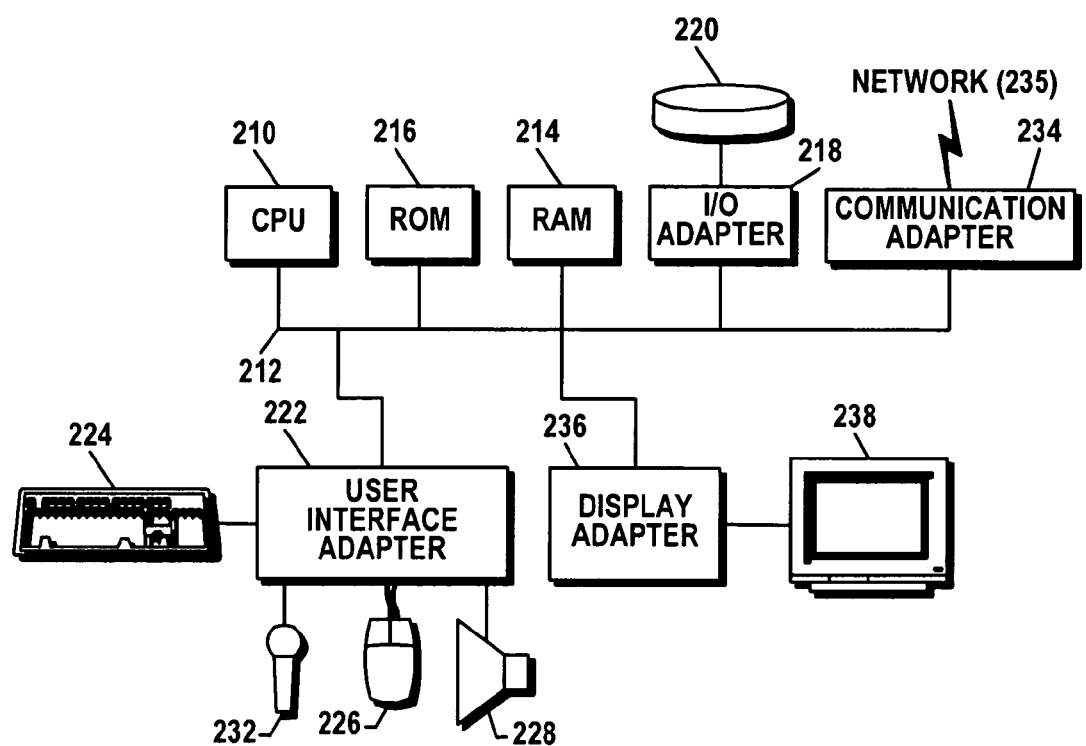
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
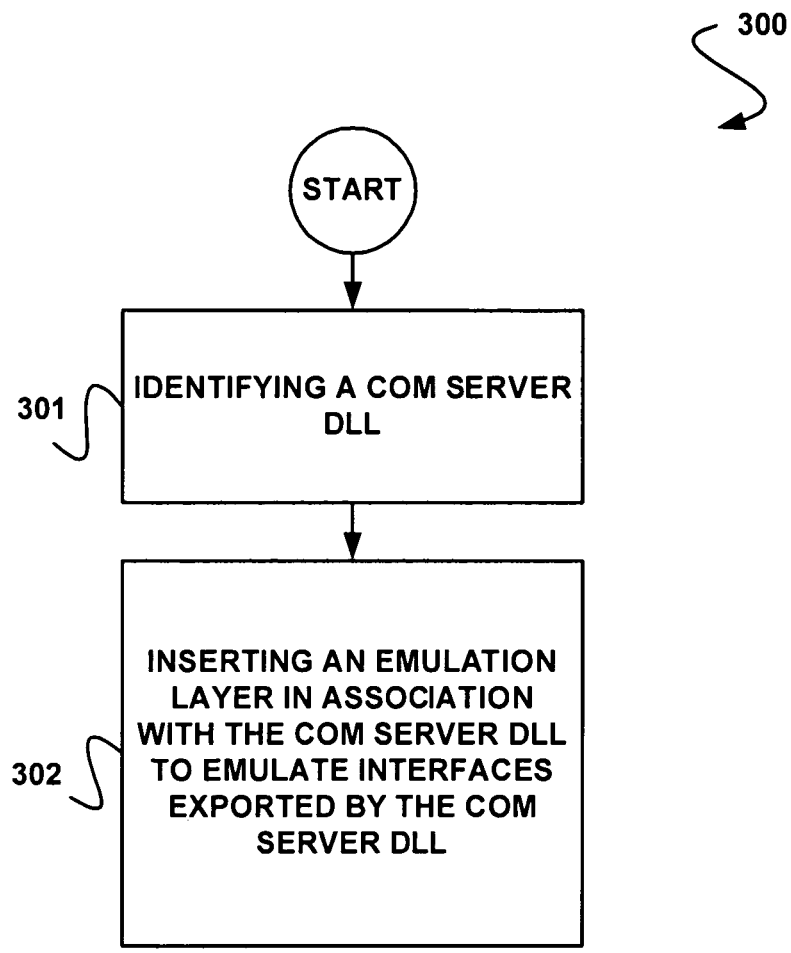
FIG. 3 shows a method for emulating interfaces exported by a component object model (COM) server dynamic link library (DLL), in accordance with one embodiment.

FIG. 3 shows a method 300 for emulating interfaces exported by a component object model (COM) server dynamic link library (DLL), in accordance with one embodiment. As an option, the method 300 may be implemented in the context of the architecture and environment of FIGS. 1 and/or 2. Of course, however, the method 300 may be carried out in any desired environment.

As shown in operation 301, a COM server DLL is identified. In the context of the present description, such COM server DLL may include any DLL associated with a MICROSOFT COM interface server. For example, the COM server DLL may include, but is not limited to a browser helper object (BHO).

In operation 302, an emulation layer is inserted in association with the COM server DLL to emulate interfaces exported by the COM server DLL. In the context of the present description, such emulation layer may include any software capable of emulating interfaces exported by the COM server DLL. By this feature, the emulation layer is capable of allowing the COM server DLL to be freed from memory or, in other words, for example, allowing access to the COM server DLL to be restricted (for security purposes, etc.), the COM server DLL to be repaired (for removing security threats), etc., without necessarily affecting operation of applications (e.g. COM client applications, etc.) using the COM server.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
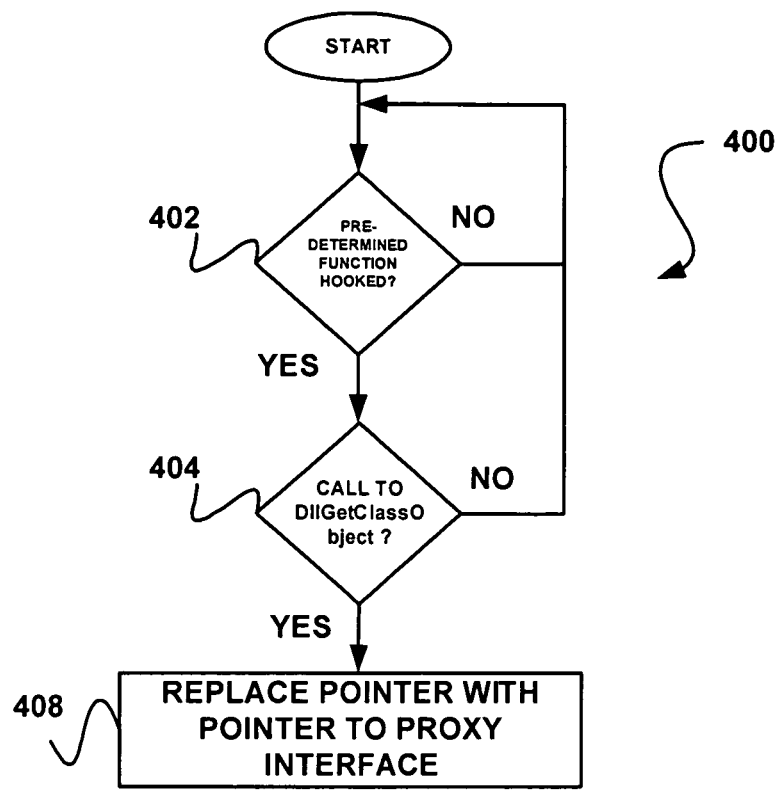
FIG. 4 shows a method for replacing a COM pointer with a pointer to a proxy interface, in accordance with another embodiment.

FIG. 4 shows a method 400 for replacing a COM pointer with a pointer to a proxy interface, in accordance with another embodiment. As an option, the method 400 may be implemented in the context of the architecture and environment of FIGS. 1-3. Of course, however, the method 400 may be carried out in any desired environment. It should also be noted that the aforementioned definitions may apply during the present description.

In use, the method 400 operates to observe a loading of any DLL. This may be accomplished any one or more of the following operations, for example. See decisions 402-404. While the decisions 402-404 are shown to operate serially, it should be noted that they may also operate in parallel, etc.

For example, it may be determined whether at least one predetermined function indicative of such loading is hooked. See decision 402. Such predetermined functions may include, but is not limited to a ntdll!LdrLoadDll function, ntdll!LdrGetProcedureAddress function, etc. As an option, such functions may be hooked inside a protected application address space. In one embodiment, this may be accomplished in user mode. Of course, however, other instructions may be hooked which are relevant in kernel mode.

Further, it may be determined whether a COM server DLL is loaded by monitoring specific functions exported by a particular DLL. See decision 404. In one optional embodiment, this may be accomplished by monitoring the functions exported from the COM server DLL (where such functions are specifically indicative of a COM server DLL). This is possible since the COM server DLL exports certain functions by specific names.

Specifically, at least one call associated with the COM server DLL may be intercepted. Such call may, in one embodiment, include a DllGetClassObject call, which indicates that it was initiated by a COM server DLL. To this end, all calls to DllGetClassObject exported from the COM server DLL may be intercepted. As an option, this may be done using a LdrGetProcedureAdddress hook. In other embodiments, the foregoing intercept may also involve functions inside an EXPORTS section in the COM server DLL.

Typically, in response to the DllGetClassObject call, a pointer is returned to an IClassFactory COM object. However, in response to the present interception, an emulation layer may be inserted by replacing such a pointer with a proxy pointer pointing to a proxy interface. Note operation 408. This may be accomplished by replacing an IClassFactory COM object interface pointer with an allocated private interface pointer, when the DllGetClassObject is called.

In various other embodiments, the proxy interface may be installed in real-time (e.g. on-the-fly, etc.), during object creation, etc. Otherwise, the calling application may store the application interface pointers inside its memory, which will not allow the COM object to be freed from memory. As a further option, the creation of COM objects may be mainly performed during program loading time. Therefore, the overhead is very negligible and, if there is any overhead, it occurs only during the application loading time.

Still yet, the number of functions to be hooked may be kept to a minimum, so the overhead of system function hooking is almost negligible. Even still, the COM object creation and freeing functions may be called only once per the life time of the COM object, so the emulation layer may be involved mainly in only one instance. For further customization, signature matching may be used to define which application(s) to monitor and which COM interface(s) to replace. Both black lists and white lists for applications and interfaces may also be used to determine which to hook/replace and which to not hook/replace.

In still other embodiments, various techniques may be used to deal with running threads. For example, before a COM server DLL is freed from memory, it may be ascertained that there is no running application thread with a thread-function residing within the COM server DLL. This may be accomplished in various ways. For example, it may be accomplished by hooking CreateThread and CreateThreadEx functions and marking the COM server DLL threads with a specific mark.

This may allow the system to catch those cases where the COM server DLL allocates some arbitrary code bytes inside the application memory to hold the thread-function code. In another example, the application threads may be enumerated, such that every thread execution context may be examined. This may allow the system to find threads that were created before the proxy method 400 was activated within the application address space.

In use, the COM hooking method 400 may need to know the definitions of the hooked COM interface, which is information that can be found through interface definition language (IDL) files, and through type libraries. IDL files and type libraries are both available through the MICROSOFT Platform SDK for all MICROSOFT COM servers.

Figure 5:
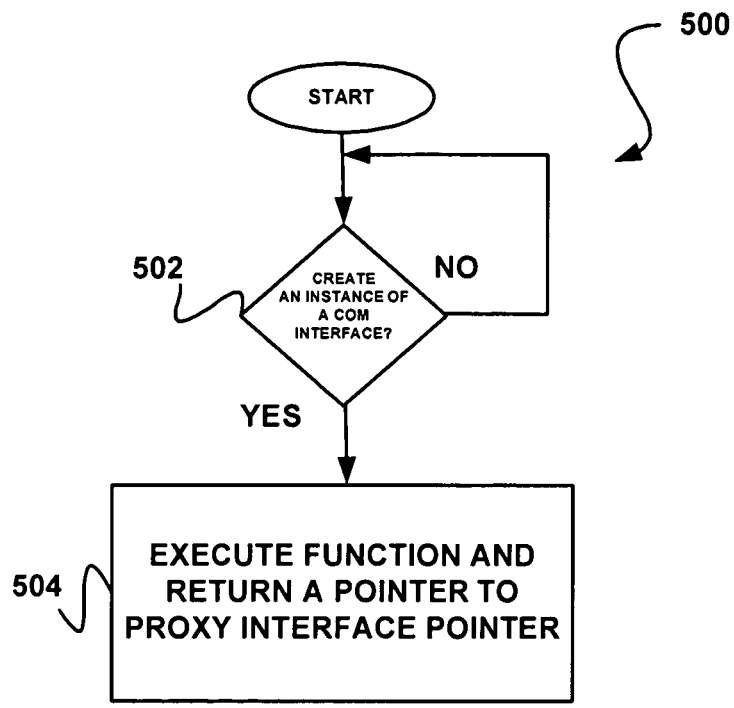
FIG. 5 shows a method for returning a pointer to a proxy interface pointer in response to the creation of an instance of a COM interface, in accordance with yet another embodiment.

FIG. 5 shows a method 500 for returning a pointer to a proxy interface in response to the creation of an instance of a COM interface, in accordance with yet another embodiment. As an option, the method 500 may be implemented in the context of the architecture and environment of FIGS. 1-4. Of course, however, the method 500 may be carried out in any desired environment. It should also be noted that the aforementioned definitions may apply during the present description.

As shown, the aforementioned emulation layer (e.g. proxy interface, etc.) may monitor any requests for creating an instance of a COM interface. Specifically, it is determined whether an instance of a COM interface has been created. See decision 502. Specifically, this may be accomplished by determining when the COM object IClassFactory->CreateInstance is called to create the instance of a COM interface. The IClassFactory interface is typically on a class object. In use, the CreateInstance method creates an uninitialized object of the class identified with a specified class identifier (CLSID). CreatInstance is used to create and free instances of the COM interface.

In response thereto, the function may be executed by the present system. However, instead of returning the COM object interface pointer, another pointer may be returned to the allocated private interface pointer. See operation 504. Such interface pointer may include a "JMP original-interface-method" instruction, a true function for more controlled operations, etc.

In one embodiment, the first interface to be requested through the IClassFactory->CreateInstance may include an IUnknown interface. In use, the IUnknown interface is typically the first interface to be replaced, since the IUnknown interface is the basis of COM interfaces. Such interface contains a set of methods that control a lifetime of a specific object, and provides a way of querying for the interfaces used by an object. The IUnknown interface includes various methods including IUnknown::AddRef, IUnknown::QueryInterface, and IUnknown::Release.

When the IUnknown->QueryInterface is called by the application to query other COM interfaces, such interface pointers are replaced with the allocated private interfaces pointers, as explained above. Of course, while not shown, the private interface may also create the originally intended interface, which may thus be referenced by the private interface functions when called by the COM client application. Further, for reasons that will soon become apparent, a private object counter may be incremented after the private COM object is created.

Figure 6:
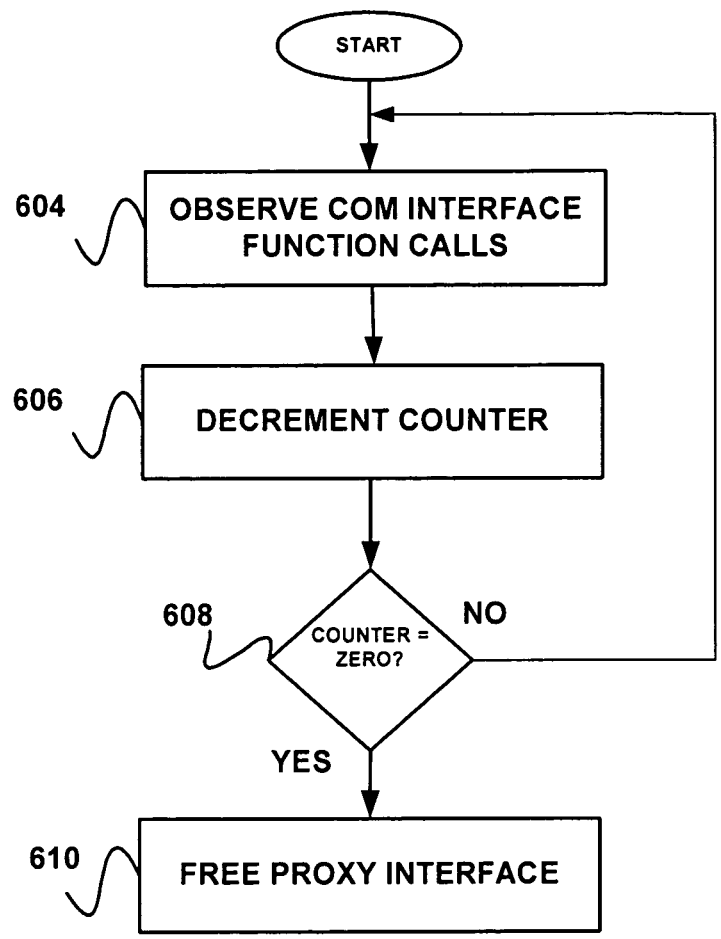
FIG. 6 shows a method for freeing a proxy interface, in accordance with still yet another embodiment.

FIG. 6 shows a method for freeing a proxy interface, in accordance with still yet another embodiment. As an option, the method 600 may be implemented in the context of the architecture and environment of FIGS. 1-3. Of course, however, the method 600 may be carried out in any desired environment. It should also be noted that the aforementioned definitions may apply during the present description.

In use, the COM interface functions calls may be observed in operation 604. To this end, in operation 606, a reference count may be decremented. Still yet, the allocated proxy interface may be freed from memory, if the reference count gets to zero. See operations 608-610. Thus, any external call to disable or free the COM server instance from memory may result in the private interface no longer calling the original interface.

Thus, in various embodiments, a proxy COM object interface is created in memory for every loaded COM object interface inside the COM client application. This technique ensures that the COM client application gets the pointers of the proxy interface methods, and therefore the DLL may be completely freed from memory without necessarily affecting the COM client application operations.

In various optional embodiments, the present techniques may allow the emulation layer to operate as a Universal COM proxy layer for any COM interface exported from any COM object. The emulation layer may thus operate as a proxy between COM client applications and the COM servers, so as to dynamically disconnect the COM interface methods whenever the COM DLL has to be freed from memory, without affecting the client application operations.

The present technology may also be used to drive the behavior of any COM object in memory. Thus, in various embodiments, the present emulation layer may be very useful from a behavioral analyses standpoint. For example, a behavioral blocking engine may use the emulation layer to understand the behaviors of COM clients and servers, and identify malicious COM clients and servers, etc., so that the appropriate reaction (e.g. quarantine, clean, delete, alert, etc.) may be provided.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by reacting to infected DLLs, which may be used to combat cyber-terrorism.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
identifying a COM server dynamic link library;
inserting an emulation layer in association with the COM server dynamic link library to emulate interfaces exported by the COM server dynamic link library, utilizing a processor, wherein it is ascertained that there is no running application thread with a thread-function residing within the COM server dynamic link library prior to inserting the emulation layer;

identifying, utilizing the emulation layer, at least one infected COM server dynamic link library; and in response to the identifying the at least one infected COM server dynamic link library:

retrieving an identifier associated with an application thread that loaded, prior to the inserting the emulation layer, the at least one infected COM server dynamic link library; and freeing, utilizing the emulation layer, the at least one infected COM server dynamic link library from memory based on the identifier.

2. The method of claim 1, and further comprising hooking predetermined functions.

3. The method of claim 2, wherein the predetermined functions include at least one of a ntdll!LdrLoadDll function and a ntdll!LdrGetProcedureAddress function.

4. The method of claim 1, and further comprising determining whether the COM server dynamic link library is loaded.

5. The method of claim 4, and further comprising intercepting at least one call associated with the COM server dynamic link library.

6. The method of claim 5, wherein the at least one call includes a DllGetClassObject call.

7. The method of claim 4, wherein the emulation layer is inserted in response to the determination.

8. The method of claim 1, wherein the emulation layer is inserted by replacing a first pointer with a proxy pointer pointing to a proxy interface.

9. The method of claim 1, wherein the responding is carried out to counter terrorism.

10. A computer program product embodied on a tangible non-transitory computer readable medium, comprising:

computer code for identifying a COM server dynamic link library;

computer code for inserting an emulation layer in association with the COM server dynamic link library to emulate interfaces exported by the COM server dynamic link library, wherein it is ascertained that there is no running application thread with a thread-function residing within the COM server dynamic link library prior to inserting the emulation layer;

computer code for identifying, utilizing the emulation layer, at least one infected COM server dynamic link library; and computer code for, in response to the identifying the at least one infected COM server dynamic link library: and retrieving an identifier associated with an application thread that loaded, prior to the inserting the emulation layer, the at least one infected COM server dynamic link library; and freeing, utilizing the emulation layer, the at least one infected COM server dynamic link library from memory based on the identifier.

11. The computer program product of claim 10, and further comprising computer code for hooking predetermined functions.

12. The computer program product of claim 11, wherein the predetermined functions include at least one of a ntdll!LdrLoadDll function and a ntdll!LdrGetProcedureAddress function.

13. The computer program product of claim 10, and further comprising computer code for determining whether the COM server dynamic link library is loaded.

14. The computer program product of claim 13, and further comprising computer code for intercepting at least one call associated with the COM server dynamic link library.

15. The computer program product of claim 14, wherein the at least one call includes a DllGetClassObject call.

16. The computer program product of claim 13, wherein the emulation layer is inserted in response to the determination.

17. The computer program product of claim 10, wherein the emulation layer is inserted by replacing a first pointer with a proxy pointer pointing to a proxy interface.

18. A system, comprising:

a processor for identifying a COM server dynamic link library, inserting an emulation layer in association with the COM server dynamic link library to emulate interfaces exported by the COM server dynamic link library, wherein it is ascertained that there is no running application thread with a thread-function residing within the COM server dynamic link library prior to inserting the emulation layer;

identifying, utilizing the emulation layer, at least one infected COM server dynamic link library; and in response to the identifying the at least one infected COM server dynamic link library:

retrieving an identifier associated with an application thread that loaded, prior to the inserting the emulation layer, the at least one infected COM server dynamic link library; and freeing, utilizing the emulation layer, the at least one infected COM server dynamic link library from memory based on the identifier.

19. The method of claim 1, wherein inserting the emulation layer allows the COM server dynamic link library to be at least one of restricted and repaired without affecting an operation of COM client applications using the COM server.

20. The system of claim 18, wherein inserting the emulation layer allows the COM server dynamic link library to be at least one of restricted and repaired without affecting an operation of COM client applications using the COM server.

* * * * *

UNITED STATES PATENT AND TRADEMARK OFFICE
CERTIFICATE OF CORRECTION

Page 1 of 1

PATENT NO. : 8,863,159 B2
APPLICATION NO. : 11/484088
DATED : October 14, 2014
INVENTOR(S) : Ahmed Said Sallam It is certified that error appears in the above-identified patent and that said Letters Patent is hereby corrected as shown below:

In the Claims,
In column 7, line 50, In Claim 10, delete "library: and" and insert -- library: --, therefor.

Signed and Sealed this
Seventeenth Day of February, 2015

Michelle K. Lee
*Deputy Director of the United States Patent and Trademark Office*